US006800196B2

(12) United States Patent
Matsuo et al.

(10) Patent No.: US 6,800,196 B2
(45) Date of Patent: Oct. 5, 2004

(54) METHOD OF AND APPARATUS FOR TREATING RADIOACTIVE LIQUID WASTES CONTAINING SURFACE ACTIVE AGENTS

(76) Inventors: Toshiaki Matsuo, c/o Hitachi, Ltd., Intellectual Property Group New Marunouchi Bldg., 5-1, Marunouchi 1-chome, Chiyoda-ku, Tokyo 100-8220 (JP); Takashi Nishi, c/o Hitachi, Ltd., Intellectual Property Group New Marunouchi Bldg., 5-1, Marunouchi 1-chome, Chiyoda-ku, Tokyo 100-8220 (JP); Takayuki Matsumoto, c/o Hitachi, Ltd., Intellectual Property Group New Marunouchi Bldg., 5-1, Marunouchi 1-chome, Chiyoda-ku, Tokyo 100-8220 (JP); Masami Matsuda, c/o Hitachi, Ltd., Intellectual Property Group New Marunouchi Bldg., 5-1, Marunouchi 1-chome, Chiyoda-ku, Tokyo 100-8220 (JP); Atsushi Yukita, c/o Hitachi, Ltd., Intellectual Property Group New Marunouchi Bldg., 5-1, Marunouchi 1-chome, Chiyoda-ku, Tokyo 100-8220 (JP)

( * ) Notice: Subject to any disclaimer, the term of this patent is extended or adjusted under 35 U.S.C. 154(b) by 0 days.

(21) Appl. No.: 10/029,260

(22) Filed: Dec. 28, 2001

(65) Prior Publication Data

US 2004/0129615 A1 Jul. 8, 2004

Related U.S. Application Data

(62) Division of application No. 09/469,627, filed on Dec. 22, 1999, now Pat. No. 6,483,004.

(30) Foreign Application Priority Data

Dec. 28, 1998 (JP) .......................................... 10-372807

(51) Int. Cl.[7] ............................ B01D 17/12; C02F 1/72

(52) U.S. Cl. ........................ 210/149; 210/177; 210/199; 210/205; 210/759; 210/760; 261/126

(58) Field of Search ................................ 210/205, 220, 210/221.2, 761, 762, 149, 177, 182, 192, 198.1, 199, 201, 202, 259, 758, 759, 760, 902, 911; 261/126; 588/1, 18, 20, 205, 228, 230; 68/18 R; 134/56 R, 105

(56) References Cited

U.S. PATENT DOCUMENTS 4,693,833 A 9/1987 Toshikuni et al. .......... 210/759

(List continued on next page.)

FOREIGN PATENT DOCUMENTS

WO 96/24937 8/1996

OTHER PUBLICATIONS

"New Technology for Ozone Utilization", New Edition, 1993, pp. 78–81, 216–217 and 282–283.

*Primary Examiner*—Joseph Drodge

(57) ABSTRACT

Radioactive laundry liquid wastes are supplied in a liquid waste heating vessel. Hydrogen peroxide and an alkali solution are supplied to the liquid waste heating vessel. The pH of the radioactive laundry liquid wastes is adjusted to 7 or higher by the alkali solution. The radioactive laundry liquid wastes are heated to 50° C. or higher by a heating device and introduced to first and second aeration vessels. The temperature is controlled by a device in accordance with the value measured by a thermometer. Ozone is supplied from an ozone generator by way of an ozone gas discharge port to the first aeration vessel. Ozone discharged from the first aeration vessel is introduced from the ozone gas discharge port to the second aeration vessel. Therefore, the amount of ozone dissolved into the radioactive laundry liquid wastes is increased so that the amount of hydroxy radicals formed for decomposing organic substances increases, since the laundry liquid wastes are heated to 50° C. or higher under the presence of hydrogen peroxide.

4 Claims, 3 Drawing Sheets

U.S. PATENT DOCUMENTS

| | | | | | |
|---|---|---|---|---|---|
| 5,160,636 | A | | 11/1992 | Gilles et al. | 210/763 |
| 5,236,595 | A | | 8/1993 | Wang et al. | 210/669 |
| 5,370,801 | A | * | 12/1994 | Sorensen et al. | 210/742 |
| 5,580,458 | A | | 12/1996 | Yamasaki et al. | 210/609 |
| 5,640,703 | A | * | 6/1997 | Brierley et al. | 588/1 |
| 5,849,201 | A | * | 12/1998 | Bradley | 210/759 |
| 5,928,521 | A | * | 7/1999 | Levec | 210/758 |
| 5,948,259 | A | | 9/1999 | Deguitre et al. | 210/602 |
| 5,960,368 | A | * | 9/1999 | Pierce et al. | 210/758 |
| 6,483,004 | B1 | * | 11/2002 | Matsuo et al. | 588/20 |

* cited by examiner

METHOD OF AND APPARATUS FOR TREATING RADIOACTIVE LIQUID WASTES CONTAINING SURFACE ACTIVE AGENTS

This is a divisional application of U.S. Ser. No. 09/469,627 filed Dec. 22, 1999, now U.S. Pat. No. 6,483,004.

BACKGROUND OF THE INVENTION

The present invention relates to a method of and an apparatus for treating radioactive liquid wastes containing surface active agents and, more in particular, it relates to a method of and an apparatus for treating radioactive liquid wastes containing surface active agents suitable for treatment of radioactive laundry liquid wastes generated from nuclear power plants.

In nuclear power plants, radioactive liquid wastes containing surface active agents such as liquid wastes after laundry of working clothes and toilet liquid wastes (hereinafter referred to as laundry liquid wastes). The laundry liquid wastes are subjected to removal or oxidative decomposing treatment of organic substances such as surface active agents contained therein, removed with radioactive cruds (hereinafter referred to as SS components) and then discharged out of a facility. Known methods of treating laundry liquid wastes include a method of adsorbing organic substances with activated carbon followed by filtration (hereinafter referred to as an activated carbon filtration treatment), a method of aerating oxidative gases such as ozone or oxygen to the laundry liquid wastes, a method of decomposing organic substances by addition of an aqueous oxidative solution such as aqueous hydrogen peroxide to the laundry liquid wastes (hereinafter referred to as an oxidizer treatment) or a method of decomposing treatment by irradiation with ultraviolet rays to the laundry liquid wastes after aeration or addition of the oxidizer (hereinafter referred to as a UV treatment).

The activated carbon filtration treatment is excellent in that SS components can be removed upon filtration of the laundry liquid wastes. However, spent activated carbon forms secondary wastes, which requires a facility for treating the activated carbon. The oxidizer treatment has a merit capable of oxidatively decomposing precipitation components formed by bonding of sweat or dirt components from human bodies and surface active agents contained in the laundry liquid wastes (hereinafter referred to as organic precipitation components) in the same manner as for the dissolved components, as well as extremely reducing the amount of secondary wastes. However, since the oxidizing reaction proceeds slowly, the oxidizer treatment is not suitable for a case requiring a high liquid waste treating rate. The oxidizing reaction of organic substances is mainly the reaction of extracting hydrogen atoms from the organic substances caused by hydroxy radicals (hereinafter referred to as OH*) formed by reaction of dissolved oxidizer and water in the laundry liquid wastes. Therefore, the problem of the oxidizer treatment is usually caused in that the OH* forming rate is extremely low when only the oxidizer is used. Further, removal of SS components is necessary before or after the oxidizer treatment. Since the reaction between ultraviolet rays and the oxidizer can outstandingly improve the OH* forming rate, the UV treatment can improve the liquid waste treating rate by the oxidizing reaction and reduce the amount of secondary wastes to be produced. However, in the UV treatment, the decomposing performance is lowered for the treatment of liquid wastes containing a great amount of organic precipitation components or SS components since transmission of ultraviolet rays is deteriorated. Accordingly, SS components have to be removed, for example, by using filtration as a pretreatment. In this process, the filter clothes suffer from clogging due to reaction products of surface active agents and organic precipitation components such as dirt.

A decomposing treatment for organic substances not using the UV treatment is disclosed in "New Technology for Ozone Utilization, New edition" (published from Sanshu Shobo, in 1993). "New Technology for Ozone Utilization, New edition" discloses, on page 79, irradiation of ultraviolet rays, as well as addition of hydrogen peroxide, addition of aqueous alkali and use of a catalyst as a method of improving the OH* forming rate from dissolved ozone. It is described that the treating rate of the organic substances can be improved by about three times compared with the case of using only ozone, by appropriately controlling the addition amount of hydrogen peroxide, assuming that the ozone aeration amount is constant. Further, it is also described that the treating rate can be improved by increasing the ozone gas aeration amount and the ozone concentration in the aeration gas while keeping the ratio constant between the ozone gas aeration amount and the addition amount of hydrogen peroxide.

"New Technology for Ozone Utilization, New edition" describes, on page 217, that a distribution coefficient (gas phase concentration/dissolved concentration) controlling the amount of ozone gas dissolved into water lowers remarkably along with the rise of temperature of the solution and it is reduced to zero at 60° C. or higher. The OH* forming rate constant increases by the increase of the self decomposition of ozone along with the rise of temperature of the solution. However, since the effect of lowering the reaction rate caused by the decrease of the dissolution amount of ozone due to lowering of the distribution coefficient becomes predominant, the oxidizer treatment has been conducted so far under cooling rather than under heating (for example, refer to page 233 of this literature). While the decomposing treatment of organic substances at a low temperature is effective for the treatment of liquid wastes containing organic substances at a low concentration, it is not suitable for the treatment of liquid wastes containing organic substances at a high concentration such as in laundry liquid wastes in a short period of time.

SUMMARY OF THE INVENTION

An object of the present invention is to provide a method of and an apparatus for treating radioactive liquid wastes containing surface active agents that can increase the rate of treating organic substances by using ozone.

The first feature of the invention for attaining the foregoing object resides in adding hydrogen peroxide and charging ozone to radioactive liquid wastes containing organic substances including surface active agents in which ozone is charged while heating the radioactive liquid wastes to 50° C. or higher.

Since the radioactive liquid wastes are heated to 50° C. or higher, bonding reaction between ozone and hydrogen peroxide is increased, and the solubility of ozone into the radioactive liquid wastes is increased under the effect of an extremely high solubility of hydrogen peroxide. Due to the effect of increasing amount of ozone in the radioactive liquid wastes and the effect of hydrogen peroxide, the amount of OH* formed in the radioactive liquid wastes is increased, to increase the decomposing rate of organic substances including surface active agents contained in the radioactive liquid wastes. Therefore, the concentration of the organic substances contained in the radioactive liquid wastes is lowered in a short period of time. Occurrence of secondary wastes is remarkably suppressed.

A second feature of the present invention for attaining the foregoing object resides in charging ozone to a plurality of aeration vessels to which the radioactive liquid wastes are supplied and charging ozone once charged into one of the aeration vessels and discharged therefrom into another aeration vessel. By the provision of the plurality of aeration vessels, the height of each aeration vessel can be reduced to facilitate installation to a controlled area in a radioactive substance handling facility. Further, the amount of treating the radioactive liquid wastes containing the surface active agents per unit time can be increased by the provision of the plurality of aeration vessels, and the ozone utilization efficiency is increased.

A third feature of the present invention for attaining the foregoing object resides in breaking bubbles of ozone charged in the aeration vessel. Since the bubbles of ozone are broken, the bubbles can be made fine to increase the area of contact between ozone and the radioactive liquid wastes. This leads to increase of the amount of ozone dissolved in the radioactive liquid wastes to further increase the decomposing rate of organic substances contained in the radioactive liquid wastes.

A fourth feature of the present invention for attaining the foregoing object resides in addition of an alkali solution to radioactive liquid wastes. The amount of ozone dissolved into the radioactive liquid wastes is increased by the effect of the alkali solution. Therefore, the decomposing rate of organic substances can further be increased. The self decomposing rate of ozone in the radioactive liquid wastes can be remarkably increased by adjusting pH of the radioactive liquid wastes supplied to the aeration vessel preferably to 7 or higher. As a result, the amount of ozone absorbed to the boundary layer between the bulk layer of the radioactive liquid wastes and ozone bubbles is increased to increase the possibility of causing gas/liquid reaction. The amount of ozone absorbed per unit volume of the radioactive liquid wastes can be increased to thereby decrease the number of aeration vessels.

DETAILED DESCRIPTION OF THE PREFERRED EMBODIMENTS

The prevent inventors have made various studies on the method capable of overcoming the foregoing problems in the UV treatment and improving the treating rate (decomposing rate) of organic substances by using ozone. In the course of the study, the following experiment was conducted. The results of experiment obtained are to be explained more in details.

Figure 2:
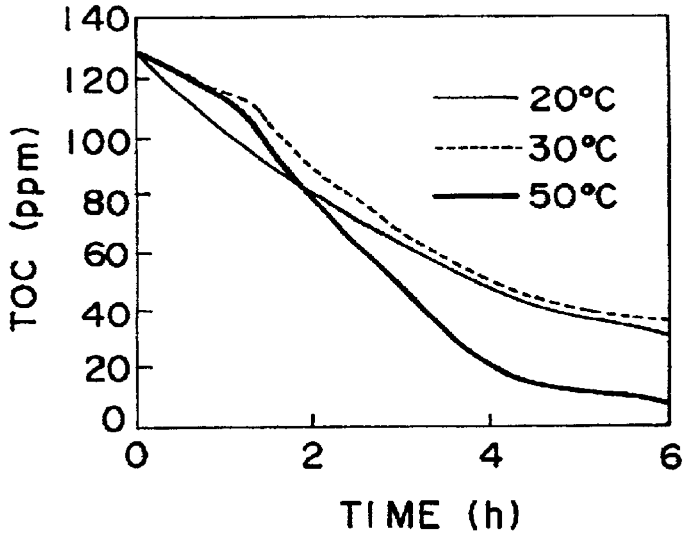
FIG. 2 is a characteristic chart illustrating the dependence of change with time of the concentration of organic substances on heating temperature.

Ozone gas was aerated at 0.4 L/min into 500 mL of an aqueous solution containing a typical surface active agent (aqueous solution container having 41 $cm^2$ of cross sectional area) and the change with time of the concentration of organic substances in the aqueous solution (TOC: total organic carbon) was examined. The aqueous solution contains 200 ppm of hydrogen peroxide. FIG. 2 shows change with time of TOC in the aqueous solution at each temperature of 20° C., 30° C. and 50° C. In a case of 20° C., ozone gas dissolves more easily and decomposition in organic substances in the aqueous solution is taken place rapidly compared with a case of 30° C. Further, in a case of 50° C., the reaction rate increases, so that organic substances contained in the aqueous solution containing a surface active agent are decomposed rapidly compared with the case of 30° C. However, in the case of 50° C., it is necessary to aerate an extremely great amount of ozone gas at a high concentration compared with the amount of liquid wastes, in order to compensate lowering of the ozone distribution coefficient along with the rise of temperature.

Figure 3:
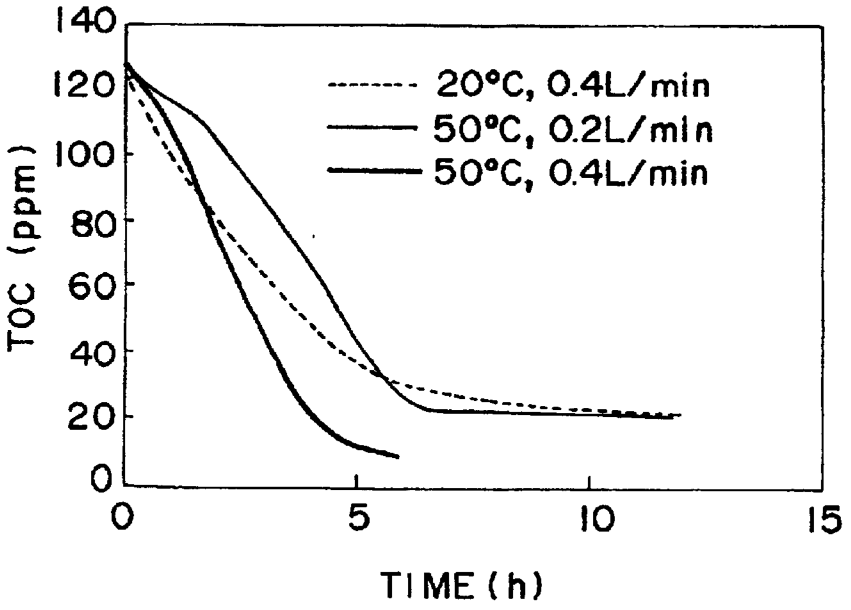
FIG. 3 is a characteristic chart illustrating the dependence of change with time of the concentration of organic substances on the aeration amount of ozone gas.

FIG. 3 shows the change with time of TOC for 500 mL of an aqueous solution containing a typical surface active agent (aqueous solution vessel having 41 $cm^2$ cross sectional area) under the condition with an ozone gas aeration amount of 0.2 and 0.4 L/min and at a solution temperature of 20° C. and 50° C. The total addition amount of hydrogen peroxide is 200 ppm in the aqueous solution containing the surface active agent in FIG. 3. As can be seen from FIG. 3, in a case of a solution temperature at 50° C. with an ozone gas aeration amount of 0.2 L/min, the decomposing rate of the organic substances is substantially equal to a case at a solution temperature of 20° C. with an ozone gas aeration amount of 0.4 L/min, and TOC is not decreased no more about below 20 ppm. It is considered that a considerable period of time is required for further decreasing the TOC down to 10 ppm or lower. For further decreasing the TOC, the ozone gas aeration amount at least more than the above mentioned value is necessary ($\geqq 5\times10^{-2}$ $m^3/min{\cdot}m^2$). TOC is lowered rapidly to 10 ppm or lower in a case at a solution temperature of 50° C. with an aeration amount of 0.4 L/min.

It can be seen from the result of FIG. 2 that TOC is reduced in the presence of hydrogen peroxide by aerating ozone gas into an aqueous solution containing surface active agents as the temperature rises. This shows that the treating rate for the organic substances in the aqueous solution containing surface active agents is increased as the temperature is higher. The data shown in FIG. 3 shows that TOC is reduced in a shorter period of time as the temperature is higher, provided that the ozone aeration amount is identical. The characteristics shown in FIG. 2 and FIG. 3 are for the case at a temperature of up to 50° C. for the aqueous solution containing surface active agents. When the ozone gas is aerated into an aqueous solution containing surface active agents at a temperature 60° C. or higher (containing hydrogen peroxide), TOC is reduced more compared with a case of 20° C. or 30° C. When ozone gas is aerated while heating an aqueous solution containing surface active agents containing hydrogen peroxide to 80° C., it was confirmed that the concentration was lowered more rapidly to the reduced value of TOC in the case of 50° C. show in FIG. 2 and FIG. 3. The aqueous solution containing surface active agents boils at 100° C. under an atmospheric pressure. Accordingly, it is desirable that the aqueous solution containing surface active agents, namely, laundry liquid wastes be preferably heated within a range from 500° C. to 100° C.

As has been described above, the present inventors have made a novel finding that the treating rate for organic substances is increased as the temperature is higher in a case of using ozone in the presence of hydrogen peroxide. This is contrary to the description of the literature "New Technology for Ozone Utilization, New edition" that "the distribution coefficient of ozone to water is lowered along with the rise of temperature and is reduced to zero at a water temperature 60° C. or higher". The literature describes for the case of water not containing hydrogen peroxide. The reason why the treating rate of the organic substances is increased in the case of using ozone at a higher temperature of the solution in the presence of hydrogen peroxide considered as below. Since coupling reaction between ozone and hydrogen peroxide highly proceeds along with the rise of temperature, the solubility of ozone to the aqueous solution containing surface active agents is increased under the effect of an extremely high solubility of hydrogen peroxide. As a result, OH* forming reaction proceeds vigorously and decomposing reaction of the organic substances in the aqueous solution containing surface active agents with OH* is activated.

The present inventors have invented a new treating method of decomposing organic substances in an aqueous solution containing surface active agents by ozone without using a UV treatment based on the novel finding as described above. Concrete examples of the treating method are to be explained below.

An apparatus for treating radioactive liquid wastes containing surface active agents as a preferred embodiment according to the present invention is to be explained below with reference to FIG. 1.

The treating apparatus of this embodiment comprises an ozone generator 1, aeration vessels 2A and 2B, and a liquid waste heating vessel 16. The liquid waste heating vessel 16 has a heating device 4 surrounding the outside of the vessel. As the heating device 4, an electric heater, a heater using high temperature steam or high temperature gas, and an aeration device for aerating high temperature steam or high temperature gas to the liquid waste heating vessel 16 may be used. A bubble breaking device 12 is disposed to 1 each of the aeration vessels 2A and 2B. The bubble breaking device 12 comprises a stirring blade 20 disposed in the aeration vessel and a motor 21 disposed outside of the aeration vessel and connected with the stirring blade 20. A pipeline 17 provided with a liquid waste circulation pump 6 is connected to the bottom of the aeration vessel 2A. The other end of the pipeline 17 is connected with the top of the aeration vessel 2B. A pipeline 10 connected to the bottom of the aeration vessel 2B is in communication with the liquid waste heating vessel 16. A liquid waste circulation pump 11 and a three-way valve 14 are disposed to the pipeline 10. A pipeline 19 inserted at one end in the liquid waste heating vessel 16 is connected to the top of the aeration vessel 2A. A liquid waste circulation pump 9 and a valve 34 are disposed to the pipeline 19. A hydrogen peroxide addition device 18 and an alkali solution addition device 13 are connected to the liquid waste heating vessel 16. The hydrogen peroxide addition device 18 comprises a hydrogen peroxide tank 22 and a valve 24 and has a pipeline 23 connecting the hydrogen peroxide tank 22 and the liquid waste heating vessel 16. The alkali solution addition device 13 has a valve 27 and has a pipeline 26 for connecting the alkali solution tank 25 and the liquid waste heating vessel 16.

A pipeline 28 connected with the ozone generator 1 is connected to an ozone gas exhaust port 3A disposed at ill the bottom in the aeration vessel 2A. The pipeline 28 has an inverted U-shaped portion 38 at the downstream of an open/close valve 35. The top of the inverted U-shaped portion 38 is situated above the liquid surface of the radioactive laundry liquid wastes in the aeration vessel 2A. In this embodiment, the top of the inverted U-shaped portion 38 is at a position identical with the upper end of the aeration vessel 2A. A pipeline 29 connected to the top of the aeration vessel 2A is connected with an ozone gas discharge port 3B disposed at the bottom in the aeration vessel 2B. A pump 7 is disposed to the pipeline 29. A pipeline 30 is connected to the top of the aeration vessel 2B. An ozone gas decomposition device 8 is disposed to the pipeline 30. The liquid waste filtration device 15 is connected by way of a pipeline 31 to the three-way valve 14. Pipelines 32 and 33 are connected to the liquid waste filtration device 15.

Laundry liquid wastes are supplied from a laundry liquid wastes supply pipeline 36 into the liquid waste heating vessel 16. The laundry liquid wastes contain surface active agents, as well as reaction products of the surface active agents and organic precipitation component such as dirt. When the valve 24 is opened, hydrogen peroxide is supplied from the hydrogen peroxide tank 22 to the liquid waste heating vessel 16. When the valve 27 is opened, the alkali solution is supplied from the alkali solution tank 25 to the liquid waste heating vessel 16. In this embodiment, an aqueous NaOH solution is used as the alkali solution. An aqueous solution of an alkali metal hydroxide such as KOH, LiOH, RbOH or CsOH may also be used in addition to the aqueous solution of NaOH. pH of the laundry liquid wastes is adjusted to 7 or higher by addition of the alkali solution. The laundry liquid wastes containing hydrogen peroxide and the alkali solution are heated to a predetermined temperature of 50° C. by the heating device 4. Temperature of the laundry liquid wastes in the liquid waste heating vessel 16 is measured by a thermometer 5. A temperature controller 37 controls current flowing to the heating device 4 based on the temperature measured by the thermometer 5 to control the temperature of the laundry liquid wastes in the liquid waste heating vessel 16 to the predetermined temperature. When the valve 34 is opened and the liquid waste circulation pump 9 is operated, heated laundry liquid wastes are supplied together with hydrogen peroxide and alkali solution through the pipeline 19 to the top of the aeration vessel 2A. When the valve 35 is opened, ozone is supplied from the ozone generator 1 through the pipeline 28 and from the ozone gas discharge port 3A to the bottom of the aeration vessel 2A. The laundry liquid wastes flow from the top to the bottom of the aeration vessel 2A while ozone flows from the bottom to the top of the aeration vessel 2A. The motor 21 for the bubble breaking device 12 is driven to rotate the stirring blade 20 and break bubbles of ozone discharged from the ozone gas discharge port 3A. The laundry liquid wastes and ozone are substantially in a counter-current contact in the aeration vessel 2A.

The laundry liquid wastes in the aeration vessel 2A are supplied by the operation of the liquid waste circulation pump 6 from the bottom of the aeration vessel 2A through the pipeline 17 to the top of the aeration vessel 2B. Further, ozone not dissolved in the laundry liquid wastes in the aeration vessel 2A is supplied by way of the pipeline 29 from the top of the aeration vessel 2A to the ozone gas discharge port 3B in the aeration vessel 2B. Also in the aeration vessel 2B, the laundry liquid wastes flow downwardly while ozone flows upwardly and brought into a counter-current contact with each other. Also in the aeration vessel 2B, the motor 21 for the bubble breaking device 12 is operated to rotate the stirring blade 20 and break bubbles of ozone. Also in the aeration vessel 2B, ozone not dissolved in the laundry liquid wastes but discharged from the top of the aeration vessel 2B is introduced through the pipeline 30 to the ozone-decomposing device 8 where it is decomposed into oxygen and discharged out of the facility. The laundry liquid wastes in the aeration vessel 2B are returned through the pipeline 10 to the liquid waste heating vessel 16 by the operation of the liquid waste circulation pump 11. In this case, the three-way valve 14 communicates the liquid waste circulation pump 11 with the liquid waste heating vessel 16.

In the aeration vessels 2A and 2B, ozone discharged from the ozone gas discharge ports 3A and 3B are dissolved into the laundry liquid wastes. Since the temperature of the laundry liquid waste is 50° C. or higher and hydrogen peroxide is present in the laundry liquid wastes, the amount of ozone dissolved in the laundry liquid wastes is increased by the reason described above. Further, the amount of ozone dissolved into the laundry liquid wastes is increased by the effect of the alkali solution added from the alkali solution addition device 13. The amount of ozone dissolved into the laundry liquid wastes can be increased. Further, since the bubbles of ozone are divided finely by the effect of the bubble breaking device 12, the area of contact between ozone and the laundry liquid wastes is increased to increase the amount of the ozone dissolved into the laundry liquid wastes.

Ozone is decomposed in the laundry liquid wastes to form OH*. As described above, since the amount of ozone dissolved into the laundry liquid wastes is increased, the amount of OH* formed is also increased. Hydrogen peroxide itself is a source of OH* and forms OH* by decomposition. Further, hydrogen peroxide has a function as a catalyst of promoting decomposition of ozone to form OH*. OH* reacts with surface active agents, oil components and organic precipitation components as organic substances in the laundry liquid wastes (oxidizing reaction) to decompose such organic substances. Organic substances other than the surface active agents are also decomposed by reaction with OH*. Such organic substances are almost decomposed into $CO_2$. Increase in the amount of OH* formed promotes decomposition of organic substances such as surface active agents to remarkably decrease the amount of organic substances in the liquid wastes. The number of stages of the aeration vessel to be installed is determined depending on the required liquid waste treating rate.

The laundry liquid wastes discharged from the aeration vessel 2B are returned by way of the three-way valve 14 to the liquid waste heating vessel 16 by the operation of the liquid-waste circulation pump 11, and then supplied again to the aeration vessels 2A and 2B. The laundry liquid wastes are circulated through the liquid waste heating vessel 16, the aeration vessels 2A and 2B and the liquid waste circulation pump 11 till TOC is reduced to less than the predetermined value. TOC in the liquid wastes discharged from the aeration vessel 2B are measured by a concentration measuring device for organic substances, not shown (for example, TOC measuring instrument).

When the measured value of TOC is reduced to less than the predetermined value, the three-way valve 14 is rotated to communicate the liquid waste circulation pump 11 with the pipeline 31. Liquid wastes discharged from the liquid waste circulation pump 11 are sent through the pipeline 31 to the liquid waste filtration device 15. The liquid waste filtration device 15 removes solids contained in the liquid wastes (including minerals such as Ca and Mg contained in water and iron rust deposited to washed clothes). The solids are taken out from the pipelines 32 and disposed as radioactive solid wastes. The liquid wastes removed the solids are at a radiation dose level of less than an allowable value and can be discharged through the pipelines 33 to the external environment.

In this embodiment, since the laundry liquid wastes are heated to 50° C., the dissolution amount of ozone increases under the presence of hydrogen peroxide as described above. Therefore, the amount of OH* formed in the laundry liquid wastes is increased by the increase of the amount of ozone dissolved in the laundry liquid wastes and under the effect of hydrogen peroxide, so that decomposing rate of the organic substances contained in the laundry liquid wastes is improved. Also in a case where the laundry liquid wastes supplied from the liquid waste supply pipeline 36 to the liquid waste heating vessel 16 contain organic precipitation components, the treating rate for the organic substances can be improved irrespective of the concentration of the precipitates. Naturally, the amount of secondary wastes to be formed can be suppressed remarkably in this embodiment.

Since the treating apparatus is operated in a controlled area facility of a nuclear power plant, the height of the apparatus is restricted. Since a plurality sets of aeration vessels are disposed in this embodiment, the height for each aeration vessel can be decreased and the apparatus can be installed in the controlled area facility. The amount of the laundry liquid wastes treated per unit time is increased by so much as the number of stages. Since this can increase the efficiency of ozone utilization and decrease the required number of ozone generators, the equipment can be simplified remarkably. Particularly, since ozone charged to one of the aeration vessels is supplied to the other aeration vessel, it may suffice to dispose only one ozone generator, which can make the equipment compact.

In this embodiment, since the bubble breaking device 12 is disposed, area of contact between ozone and laundry liquid wastes is increased to increase the amount of ozone dissolved in the laundry liquid wastes as described above. This leads to increase in the treating rate of the organic substances and can decrease the number of aeration vessels.

Further, in this embodiment, since the alkali solution is added to the laundry liquid wastes to increase pH of the liquid wastes to 7 or higher, the self decomposing rate constant of ozone in the laundry liquid wastes can be increased. As a result, the amount of ozone absorbed to the boundary layer between the bulk layer of liquid wastes and ozone bubbles is increased. Since the possibility for the occurrence of gas/liquid reaction at the boundary layer is increased, the amount of ozone absorbed and utilized per unit volume of the laundry liquid wastes is increased. This can also decrease the number of aeration vessels and improve the treating rate of the organic substances.

In this embodiment, since the inverted U-shaped portion 38 is disposed to the pipeline 28 and the top of the inverted U-shaped portion 38 is situated above the liquid level of the laundry liquid wastes formed in the aeration vessel 2A, even if supply of ozone from the ozone generator 1 is stopped while leaving the open/close valve 35 to open, intrusion of the laundry liquid wastes from the aeration vessel 2A to the ozone generator 1 can be prevented.

According to this embodiment, since the organic precipitation components contained in the laundry liquid wastes are-previously oxidized by ozone and then filtered by the liquid waste filtration device 15, clogging of the filter in the liquid waste filtration device 15 can be prevented. Accordingly, this enables rapidly filtration treatment by a filtration device applied with entire amount filtration system, which suffered from remarkable lowering in the filtration rate.

In this embodiment, since only ozone and hydrogen peroxide are used as the oxidizer for removing organic substances by decomposition, treatment causing no secondary wastes is possible in principle. Further, since reaction under the effect of ultraviolet rays is not adopted, the treatment suffers from no effect of optical shielding caused by precipitations in the laundry liquid wastes. Therefore, treatment can be conducted not depending on the concentration of precipitates.

While the laundry liquid wastes supplied to the aeration vessel are heated by the liquid waste heating vessel 16 in this embodiment, laundry liquid wastes may be heated also by disposing the heating device 4 to the aeration vessels 2A and 2B and the laundry liquid wastes may be heated while aerating ozone at the ozone aeration position.

Figure 4:
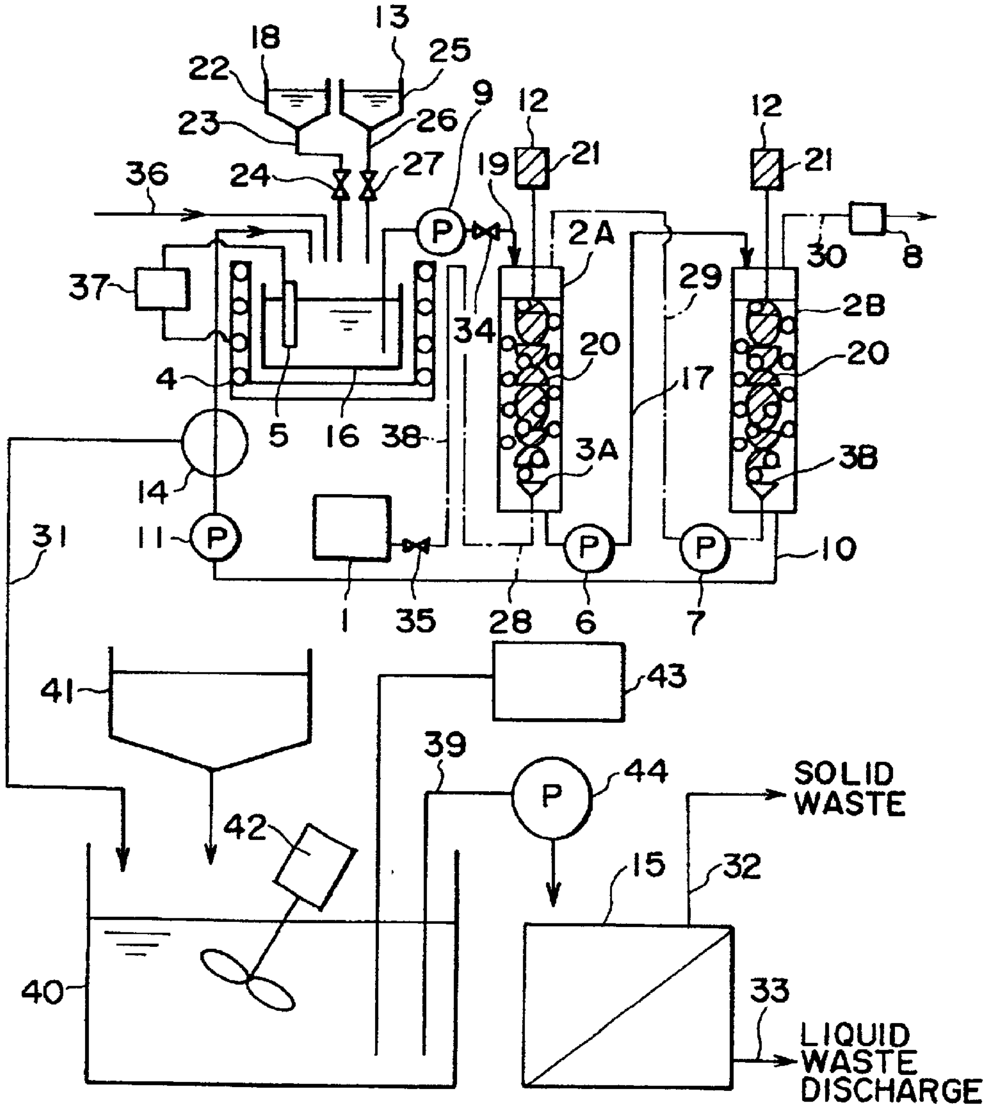
FIG. 4 is a constitutional view of an apparatus for treating radioactive liquid wastes containing surface active agents as another embodiment according to the present invention.

An apparatus for treating radioactive liquid wastes containing surface active agents as another embodiment according to the present invention is to be explained with reference to FIG. 4.

Figure 1:
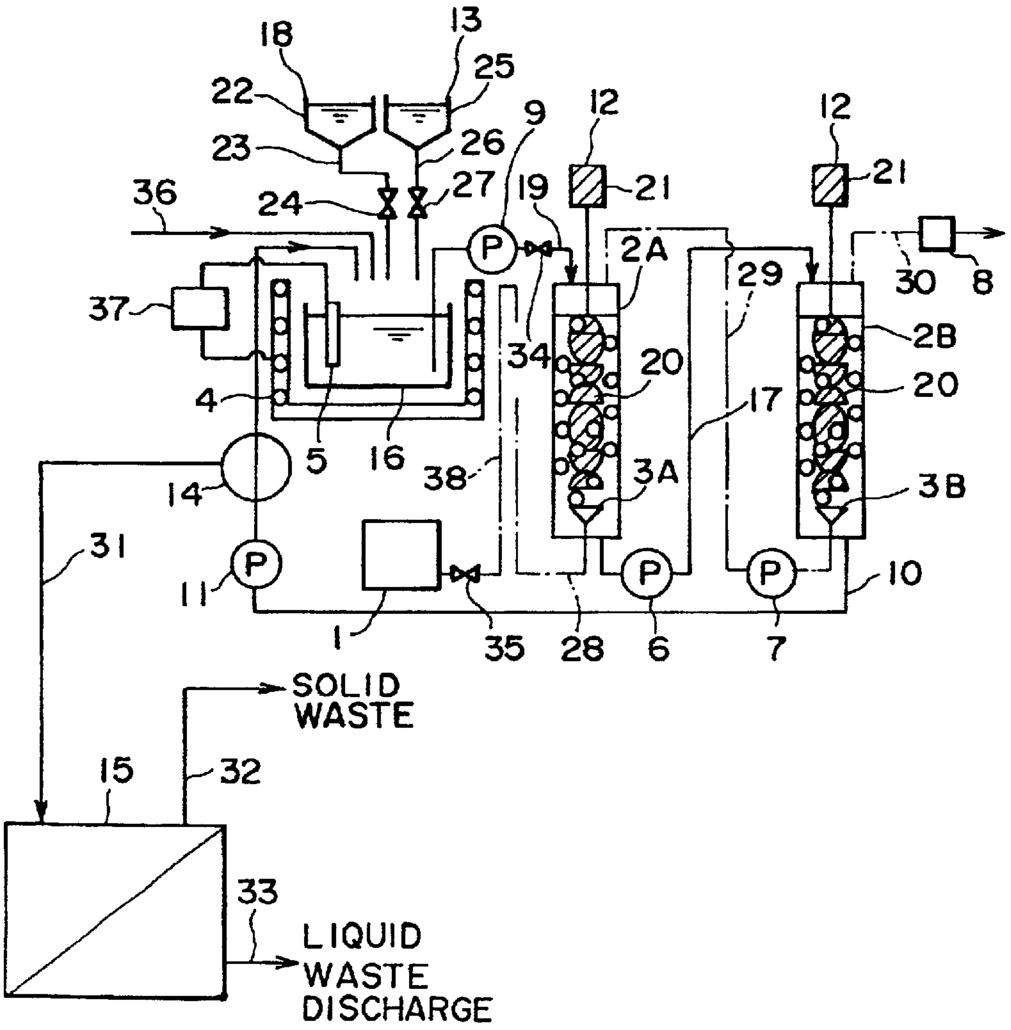
FIG. 1 is a constitutional view of an apparatus for treating radioactive liquid wastes containing surface active agents as a preferred embodiment of the present invention.

In this embodiment, a liquid waste tank 40, activated carbon supply device 41, a liquid waste stirrer 42, an organic concentration measurement device 43 and a pump 44 are additionally disposed to the constitution in FIG. 1.

The liquid waste tank 40 is connected to a pipeline 31. The liquid waste stirrer 42 is disposed to the liquid waste tank 40. The activated carbon supply device 41 is connected to the liquid waste tank 40. A pipeline 39 having a pump 44 communicates the liquid waste tank 40 with a liquid waste filtration device 15. Liquid wastes discharged from a three-way valve 14 are introduced into the liquid waste tank 40. Powdery activated carbon is supplied from the activated carbon supply device 41 to the liquid waste tank 40, and the liquid wastes and the powdery activated carbon are mixed by the liquid waste stirrer 42.

Organic substances remained not decomposed by the effect of ozone are adsorbed to activated carbon.

The concentration of the organic substances in the liquid wastes is measured by the organic concentration measuring instrument 43 and decrease of the concentration of the organic substances in the liquid wastes is confirmed based on the measurement. A TOC concentration measuring instrument or the like is used as the organic concentration measuring instrument 43. The liquid wastes containing the powdery activated carbon are supplied to the liquid waste filtration device 15. The liquid waste filtration device 15 removes solids such as powdery activated carbon. The liquid wastes removed the solids (at a radiation dose level of lower than the allowable value) are discharged through a pipeline 33 to the external environment. The removed solids such as powdery activated carbon are disposed as solid wastes.

This embodiment provides the same effect as that of the embodiment shown in FIG. 1. Particularly, organic substances that can not be decomposed by the effect of ozone can be removed completely. However, since the liquid waste tank 40, the activated carbon supply device 41 and the liquid waste stirrer 42 are provided in this embodiment, the constitution of the apparatus is increased in the scale than the embodiment shown in FIG. 1.

What is claimed is:

1. A treating apparatus for treating a radioactive liquid waste containing a surface active agent, comprising:

a means for adding aqueous hydrogen peroxide to a radioactive liquid waste containing an organic substance including a surface active agent;

a heating device for heating said radioactive liquid waste;

a thermometer located for measuring the temperature of said radioactive liquid waste;

a control device operable for controlling said heating device such that said radioactive liquid waste is at a predetermined temperature by using the measured value of said thermometer;

a means for charging ozone to said radioactive liquid waste containing aqueous hydrogen peroxide; and a means for breaking bubbles of the ozone charged to said radioactive liquid waste.

2. A treating apparatus as defined in claim 1, wherein an alkali solution is added to said radioactive liquid waste.

3. A treating apparatus as defined in claim 1, further comprising a means for removing a solid component contained in said radioactive liquid waste in which said organic substance is decomposed.

4. A treating apparatus as defined in claim 2, further comprising a means for removing a solid component contained in said radioactive liquid waste in which said organic substance is decomposed.

* * * * *